(12) United States Patent
Baten

(10) Patent No.: US 9,027,351 B2
(45) Date of Patent: May 12, 2015

(54) SYSTEM AND METHOD FOR PACKAGING AND TRANSPORTING A GAS TURBINE

(75) Inventor: Robert Allen Baten, Baytown, TX (US)

(73) Assignee: General Electric Company, Schenectady, NY (US)

(*) Notice: Subject to any disclaimer, the term of this patent is extended or adjusted under 35 U.S.C. 154(b) by 321 days.

(21) Appl. No.: 13/154,768

(22) Filed: Jun. 7, 2011

(65) Prior Publication Data
US 2012/0312707 A1 Dec. 13, 2012

(51) Int. Cl.
*B65D 85/68* (2006.01)
*F01D 25/28* (2006.01)
*F23R 3/60* (2006.01)
*F02C 7/20* (2006.01)

(52) U.S. Cl.
CPC .............. *F01D 25/285* (2013.01); *F23R 3/60* (2013.01); *B65D 2585/6875* (2013.01); *B65D 85/68* (2013.01); *F02C 7/20* (2013.01); *F05D 2260/02* (2013.01)

(58) Field of Classification Search
CPC ............. F23R 3/60; F02C 7/20; B65D 85/68; B65D 2585/6875; B65D 2585/6877
USPC .................... 60/796, 797, 798, 772; 206/319; 248/554
See application file for complete search history.

(56) References Cited

U.S. PATENT DOCUMENTS

| 2,481,547 | A |   | 9/1949  | Walker et al. |            |
|-----------|---|---|---------|---------------|------------|
| 2,591,399 | A | * | 4/1952  | Howard et al. | 60/796     |
| 2,650,753 | A | * | 9/1953  | Alan et al.   | 415/137    |
| 3,115,753 | A | * | 12/1963 | Sherburne     | 60/721     |
| 3,462,949 | A | * | 8/1969  | Anderson et al.| 60/796    |
| 3,556,672 | A | * | 1/1971  | Gentile       | 415/134    |
| 3,791,682 | A | * | 2/1974  | Mitchell      | 290/2      |
| 4,002,023 | A | * | 1/1977  | Hartmann      | 60/797     |
| 4,007,388 | A | * | 2/1977  | Lawyer et al. | 310/51     |
| 4,050,660 | A | * | 9/1977  | Eggmann et al.| 248/676    |
| 4,487,014 | A | * | 12/1984 | Vinciguerra   | 60/797     |
| 5,517,822 | A | * | 5/1996  | Haws et al.   | 60/618     |
| 5,564,271 | A | * | 10/1996 | Butler et al. | 60/796     |
| 6,196,795 | B1| * | 3/2001  | Jahr et al.   | 415/213.1  |

(Continued)

FOREIGN PATENT DOCUMENTS

EP          1898070 A2    12/2008

OTHER PUBLICATIONS

Leduc, Martin. "The Gas Turbine: The Emerging Prime Mover". http://www.dieselduck.net/machine/01%20prime%20movers/gas_turbine/gas_turbine.htm. Mar. 2001.*

*Primary Examiner* — Phutthiwat Wongwian
*Assistant Examiner* — Michael B Mantyla
(74) *Attorney, Agent, or Firm* — Dority & Manning, P.A.

(57) ABSTRACT

A system for packaging a gas turbine includes an enclosure peripherally surrounding and extending along a length of the gas turbine. The enclosure comprises first and second ends with a passage between the enclosure and the gas turbine. The system further includes means for connecting the first and second ends to an air filtration system and an exhaust system, respectively. A plurality of supports are connected to and extend radially inward from the enclosure with means for connecting the plurality of supports to the gas turbine. A method for packaging a gas turbine includes connecting the gas turbine to a plurality of supports and connecting the plurality of supports to an enclosure peripherally surrounding and extending along a length of the gas turbine. The method further includes connecting first and second ends to an air filtration system and an exhaust system, respectively.

20 Claims, 6 Drawing Sheets

(56) References Cited

U.S. PATENT DOCUMENTS

| | | | |
|---|---|---|---|
| 6,230,481 B1 * | 5/2001 | Jahr | 60/796 |
| 6,412,284 B1 * | 7/2002 | Horner | 60/772 |
| 6,449,957 B1 * | 9/2002 | Takamatsu et al. | 60/796 |
| 6,470,689 B2 * | 10/2002 | Schroeder et al. | 60/796 |
| 6,477,843 B2 | 11/2002 | Schroeder et al. | |
| 6,564,820 B2 * | 5/2003 | Christman | 137/192 |
| 6,765,304 B2 * | 7/2004 | Baten et al. | 290/1 A |
| 6,786,051 B2 * | 9/2004 | Kristich et al. | 60/796 |
| 6,962,057 B2 * | 11/2005 | Kurokawa et al. | 60/796 |
| 7,043,924 B2 | 5/2006 | Kuroki et al. | |
| 7,461,510 B1 * | 12/2008 | Munson, Jr. | 60/796 |
| 2004/0227033 A1 * | 11/2004 | Picard et al. | 244/54 |
| 2007/0220895 A1 * | 9/2007 | Horner | 60/772 |
| 2009/0049842 A1 * | 2/2009 | Canham et al. | 60/796 |
| 2010/0025409 A1 * | 2/2010 | Hunter | 220/567.2 |
| 2010/0095683 A1 * | 4/2010 | Glynn et al. | 60/796 |
| 2010/0162726 A1 * | 7/2010 | Robertson et al. | 60/797 |

\* cited by examiner

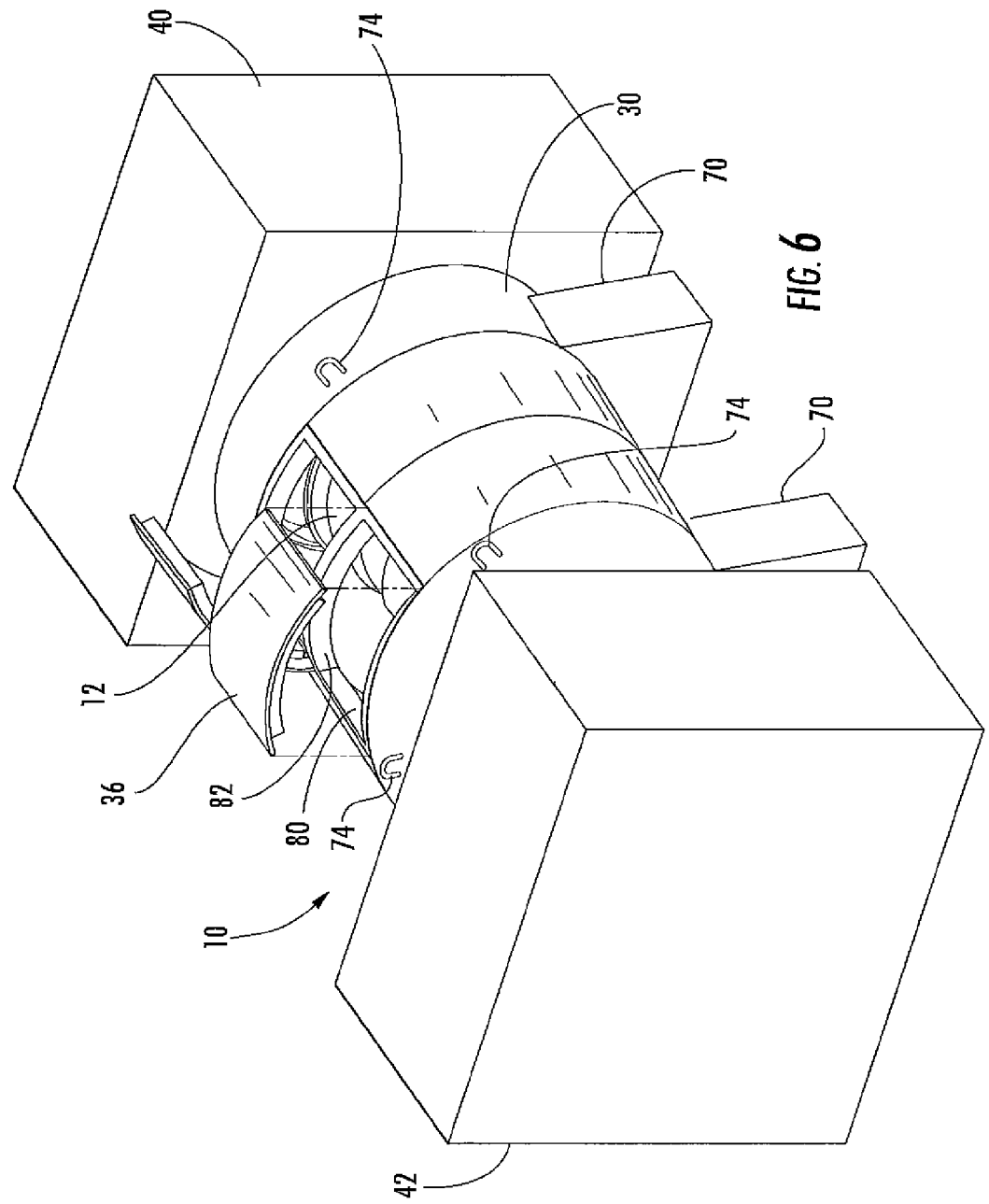

SYSTEM AND METHOD FOR PACKAGING AND TRANSPORTING A GAS TURBINE

FIELD OF THE INVENTION

The present invention generally involves a system and method for packaging a gas turbine. In particular embodiments, the system and method may be used for packaging the gas turbine for transport to a desired location.

BACKGROUND OF THE INVENTION

Gas turbines are commonly used in commercial power plants to generate electricity. A typical gas turbine includes an axial compressor at the front, one or more combustors around the middle, and a turbine at the rear. Ambient air enters the compressor, and rotating blades and stationary vanes in the compressor progressively impart kinetic energy to the working fluid (e.g., air) to produce a compressed working fluid at a highly energized state. The compressed working fluid exits the compressor and flows through nozzles in the combustors where it mixes with fuel and ignites to generate combustion gases having a high temperature and pressure. The combustion gases expand in the turbine to produce work. For example, expansion of the combustion gases in the turbine may rotate a shaft connected to a generator to produce electricity.

The gas turbine is normally mounted on a platform and connected one or more auxiliary systems that supply the gas turbine with various fluids or electricity needed to operate the gas turbine and/or monitor various operating parameters of the gas turbine. The auxiliary systems may supply, for example, fuel and oil to operate the gas turbine, water for fire suppression, and/or instrumentation for monitoring and/or operating the gas turbine. The compressor of the gas turbine typically connects to an air filtration system that supplies the compressor with a clean supply of air that is free of particulates and other contamination that may adversely affect the operation and reliability of the gas turbine. The turbine of the gas turbine typically connects to an exhaust system that receives the combustion gases exiting the turbine and processes the combustion gases prior to release to the environment.

The entire gas turbine and/or auxiliary systems are generally enclosed by a building that provides a controlled environment around the gas turbine. For example, the air filtration system may also supply ventilation inside the building around the gas turbine to provide a suitable environment for users to operate and/or perform maintenance in the vicinity of the gas turbine. The building may also include insulation that reduces sound from the gas turbine from being transmitted to the environment.

Occasionally, the gas turbine must be removed and replaced by another gas turbine. The removal and replacement of the gas turbine is both expensive and time-consuming. Specifically, the gas turbine being removed must be disconnected from the various auxiliary systems, air filtration system, and exhaust system, suitably packaged for transportation, and transported out of the building. The replacement gas turbine must similarly be transported into the building, unpackaged, and reconnected to the various auxiliary systems, air filtration system, and exhaust system. In addition, and perhaps more costly, the removal and replacement may take 3-7 days, or longer, to accomplish, resulting in lost revenue due to the lack of power production during the removal and replacement. Therefore, an improved system and method for packaging and transporting a gas turbine would be useful.

BRIEF DESCRIPTION OF THE INVENTION

Aspects and advantages of the invention are set forth below in the following description, or may be obvious from the description, or may be learned through practice of the invention.

One embodiment of the present invention is a system for packaging a gas turbine. The system includes an enclosure peripherally surrounding and extending along a length of the gas turbine. The enclosure comprises a first end and a second end with a passage between the enclosure and the gas turbine. The system further includes means for connecting the first end of the enclosure to an air filtration system and means for connecting the second end of the enclosure to an exhaust system. A plurality of supports are connected to and extend radially inward from the enclosure with means for connecting the plurality of supports to the gas turbine.

Another embodiment of the present invention is a system for packaging a gas turbine that includes an enclosure peripherally surrounding and extending along a length of the gas turbine. The enclosure comprises a first end and a second end with a passage between the enclosure and the gas turbine. A first clamp proximate to the first end of the enclosure connects the first end of the enclosure to an air filtration system, and a second clamp proximate to the second end of the enclosure connects the second end of the enclosure to an exhaust system. A plurality of supports connect to and extend radially inward from the enclosure, and each of the plurality of supports connects the enclosure to the gas turbine.

The present invention may also include a method for packaging a gas turbine that comprises connecting the gas turbine to a plurality of supports and connecting the plurality of supports to an enclosure peripherally surrounding and extending along a length of the gas turbine. The method further includes connecting a first end of the enclosure to an air filtration system and connecting a second end of the enclosure to an exhaust system.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 6 is a perspective view of the system according to an alternate embodiment of the present invention.

DETAILED DESCRIPTION OF THE INVENTION

Figure 1:
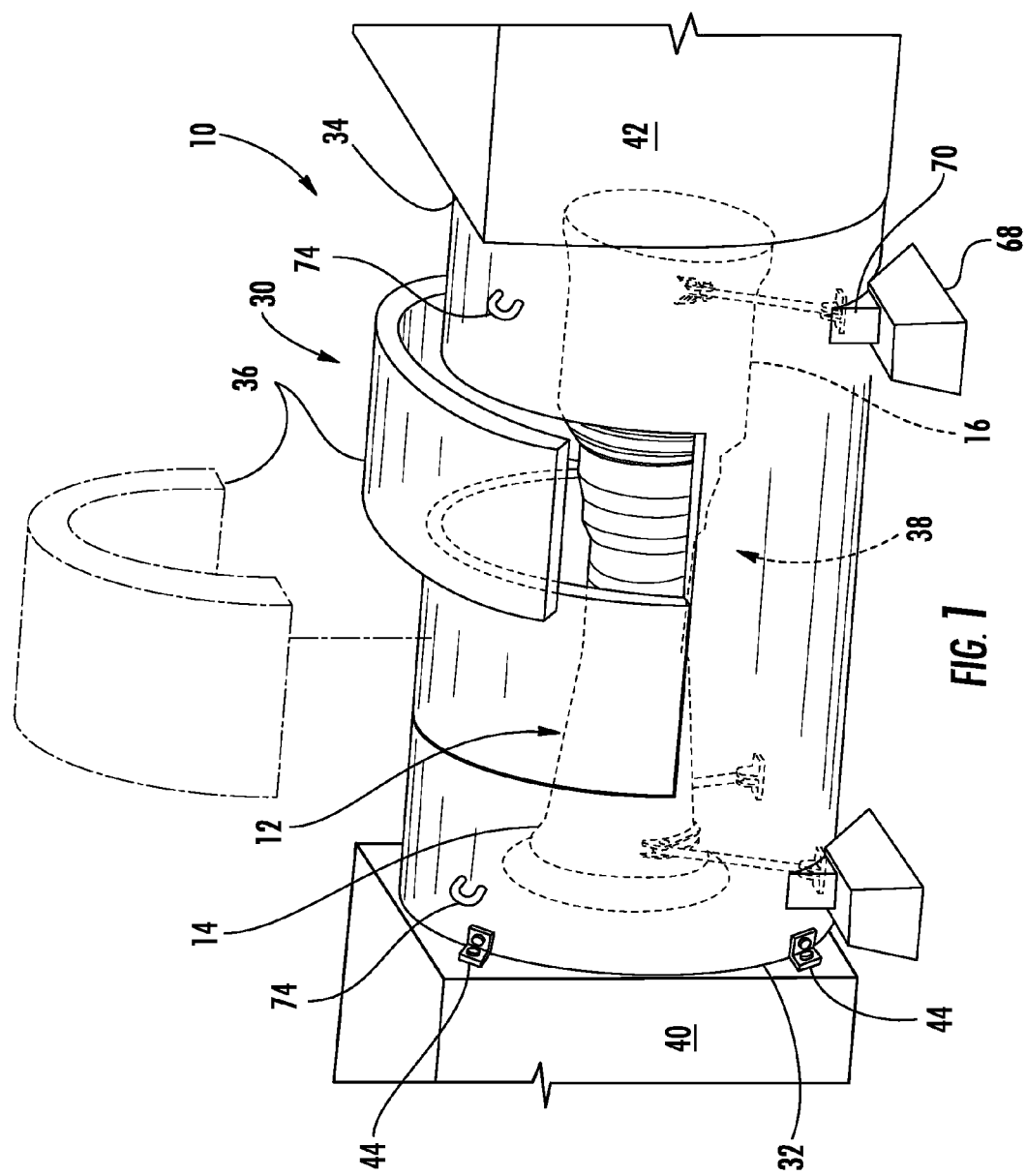
FIG. 1 is a side perspective view of a system according to one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention provide a system 10 and method for packaging and/or transporting a gas turbine 12. The gas turbine 12 may comprise a compressor 14 at the front, one or more combustors radially arranged around the middle (not shown for clarity), and a turbine 16 at the rear, as is generally known in the art. A shaft 18 may extend through the gas turbine 12 to connect the turbine 16 to a generator 20 or other mechanically driven device. However, the various embodiments of the present invention are not limited to any particular gas turbine unless specifically recited in the claims.

FIG. 1 provides a side perspective view of the system 10 according to one embodiment of the present invention. As shown, the system 10 generally comprises an enclosure 30 that peripherally surrounds and extends along a length of the gas turbine 12. The enclosure 30 may comprise any geometric shape, and in particular embodiments the enclosure 30 may partially or completely surround the entire outer perimeter of the gas turbine 12. For example, as shown in FIG. 1, the enclosure 30 is substantially cylindrical and has a first end 32 and a second end 34. In addition, the enclosure 30 may include one or more access hatches 36 that may be removable or may pivot to an open position. In this manner, the enclosure 30 defines an annular passage 38 between the enclosure 30 and the gas turbine 12, and the access hatches 36 provide an entry point for a user to enter the annular passage 38 to perform various maintenance or repair operations on the gas turbine 12.

Figure 2:
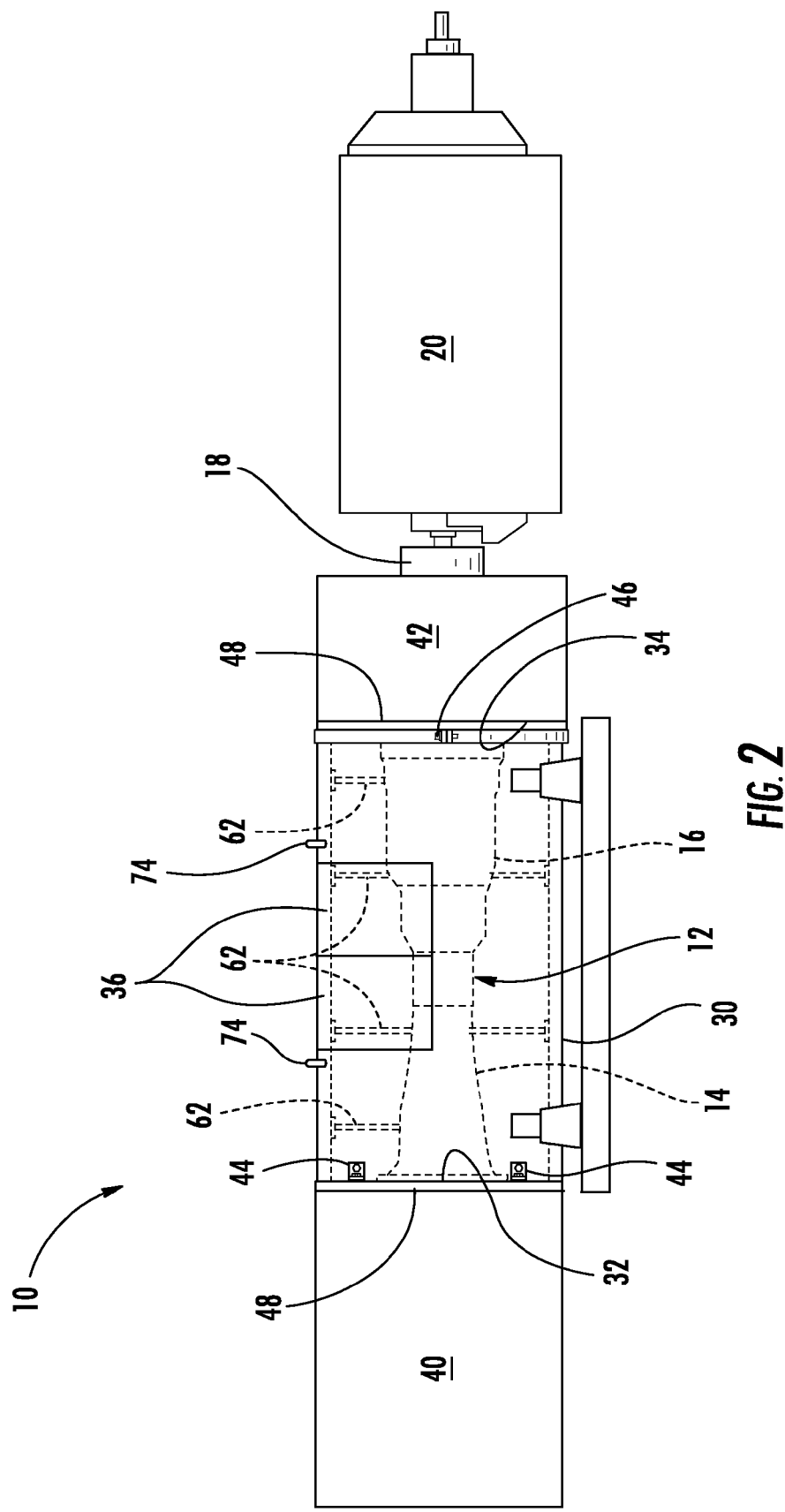
FIG. 2 is a side plan view of the system shown in FIG. 1.

FIG. 2 provides a side plan view of the system 10 shown in FIG. 1. As shown, the system 10 includes means for connecting the first end 32 of the enclosure 30 to an air filtration system 40 and means for connecting the second end 34 of the enclosure 30 to an exhaust system 42. Each means may comprise any suitable structure for joining one component to another. For example, each means may comprise one or more bolts, screws, latches, clamps, and/or closure rings that allow the first and second ends 32, 34 to be removably connected to the air filtration system 40 and the exhaust system 42, respectively. As shown in FIG. 2, for example, a first clamp 44, such as a hasp and bolt, proximate to the first end 32 may be used to connect the first end 32 of the enclosure 30 to the air filtration system 40. Similarly, a second clamp 46, such as a closure ring, proximate to the second end 34 may be used to connect the second end 34 of the enclosure 30 to the exhaust system 42. If desired, a suitable gasket material 48 may be placed between the first end 32 and air filtration system 40 and/or the second end 34 and the exhaust system 42 to provide a substantially airtight seal between the first and second ends 32, 34 and the air filtration system 40 and the exhaust system 42, respectively. In this manner, the enclosure 30 may provide a substantially air impermeable barrier around the gas turbine 12 when the first end 32 is connected to the air filtration system 40 and the second end 34 is connected to the exhaust system 42. As a result, the air filtration system 40 may provide filtered air to both the compressor 14 as well as to the annular passage 38 surrounding the gas turbine 12. In addition, the exhaust system 42 may receive combustion gases from the turbine 16 as well as ventilation flow through the annular passage 38 supplied by the air filtration system 40. In particular embodiments, the exhaust system 42 may include an evacuation fan that draws a vacuum on the annular passage 38 to provide the ventilation flow through the annular passage 38.

Figure 3:
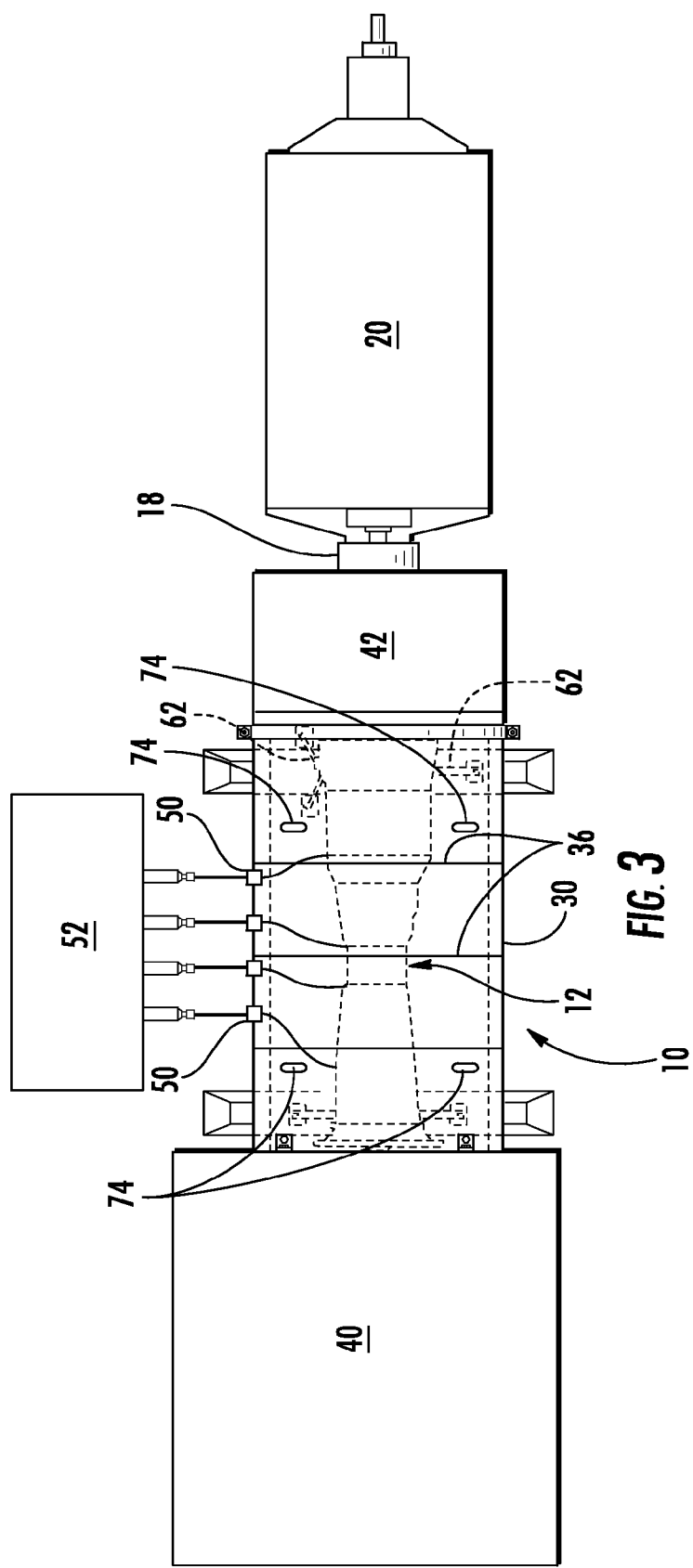
FIG. 3 is a top plan view of the system shown in FIG. 1.

FIG. 3 provides a top plan view of the system 10 shown in FIG. 1. As shown in this view, the system 10 may further include a plurality of fittings 50 through the enclosure 30 that provide fluid and/or electrical connections between the gas turbine 12 and one or more auxiliary systems 52 outside of the enclosure 30. The fittings 50 may comprise any suitable device for providing fluid and/or electrical communication through the enclosure 30. For example, the fittings may comprise quick release connectors, threaded couplings, plugs, or other similar devices known to one of ordinary skill in the art. The auxiliary systems may include, for example, pumps, motors, throttle valves, bleed valves, filters, heat exchangers, instrumentation, and other similar systems used in the operation and/or monitoring of the gas turbine 12. In this manner, the enclosure 30 provides fluid and/or electrical communication from the auxiliary systems 52 to the gas turbine 12 while still allowing the various auxiliary systems 52 to be relatively close to the gas turbine 12.

Figure 4:
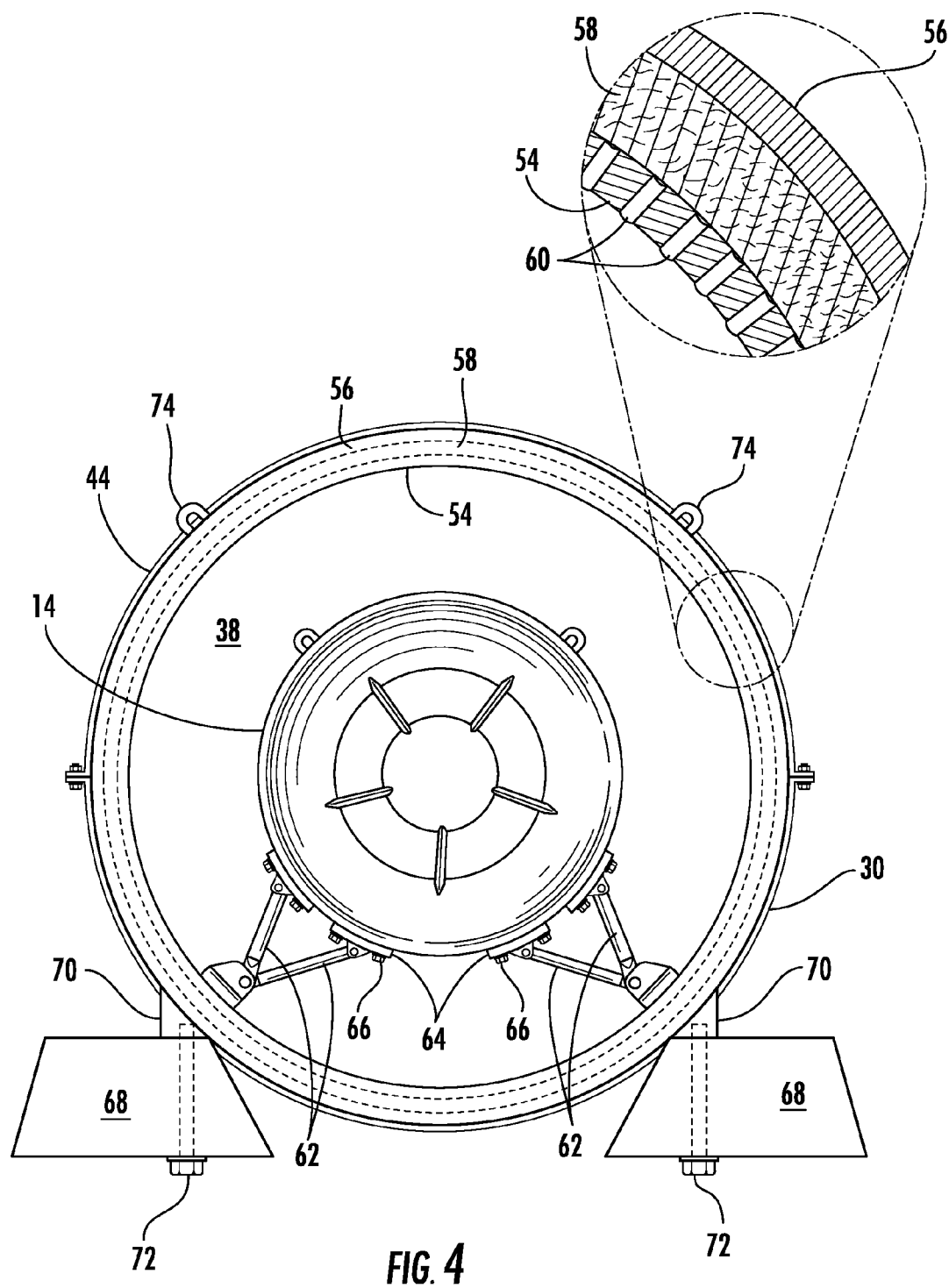
FIG. 4 is a front axial view of the system shown in FIG. 1.

FIG. 4 provides a front axial view of the system 10 shown in FIG. 1. As shown, the enclosure 30 may comprise an inner wall 54, an outer wall 56, and insulation 58 between the inner and outer walls 54, 56. The inner wall 54 may include perforations 60 that allow sound transmitted by the gas turbine 12 to be dampened by the installation 58 between the inner and outer walls 54, 56.

As further shown in FIG. 4, the system 10 may further include a plurality of supports 62 connected to and extending radially inward from the enclosure 30 and means for connecting the plurality of supports 62 to the gas turbine 12. The means for connecting the plurality of supports 62 to the gas turbine 12 may comprise any suitable structure for joining one component to another. For example, the means may comprise one or more bolts, screws, latches, clamps, and/or plates that connect each support 62 to the gas turbine 12. By way of example and not a limitation of the present invention, FIG. 4 illustrates a combination of plates 64 and the bolts 66 as the means for connecting the supports 62 to the gas turbine 12. In this manner, the supports 62 transfer the weight of a gas turbine 12 to the enclosure 30, and means for mounting the enclosure 30 transfer the weight of the gas turbine 12 and the enclosure 30 to a base 68 external to the enclosure 30. The means for mounting the enclosure 30 may comprise any suitable combination of blocks, bolts, or projections on the outside of the enclosure 30 adapted to provide a complementary mating with the base 68. For example, as shown in FIG. 4, the means for mounting the enclosure 30 may comprise a mounting fixture 70 external to the enclosure 30 that rests upon the base 68. If desired, a bolt 72 or other attachment device may be used to fixedly connect the mounting fixture 70 to the base 68.

As best shown in FIGS. 1 and 4, the system 10 may further include means for lifting the enclosure 30. The means for lifting the enclosure 30 may comprise any suitable structure known in the art for providing an attachment point to the enclosure 30. For example, as shown in FIGS. 1 and 4, the means may comprise a lifting attachment 74, such as a plurality of hasps welded or bolted to the enclosure 30, adapted to receive a cable or other lifting strap suitably sized to lift the entire enclosure 30 and gas turbine 12 contained within the enclosure 30.

Figure 5:
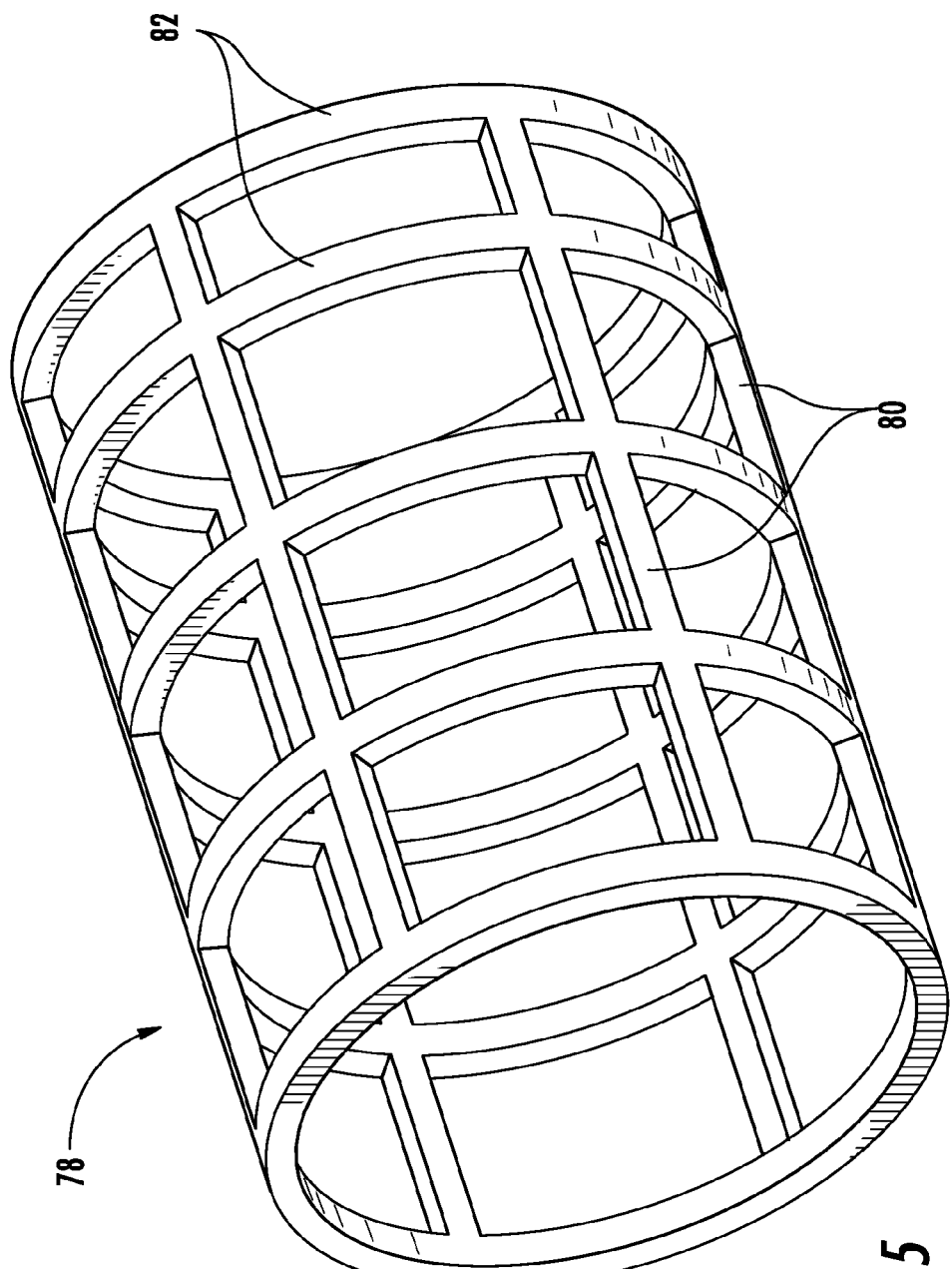
FIG. 5 is a perspective view of an enclosure superstructure according to an alternate embodiment of the present invention.

FIG. 5 provides a perspective view of an enclosure superstructure 78 according to an alternate embodiment of the present invention, and FIG. 6 provides a perspective view of the system 10 according to an alternate embodiment of the present invention. As shown in FIG. 5, a network of longitudinal and radial members 80, 82 may define the enclosure superstructure 78 and provide the structural support for the gas turbine 12. The longitudinal and radial members 80, 82 are illustrated as having a square or rectangular cross-section; however, the particular geometry of the members 80, 82 is not a limitation of the present invention unless specifically recited in the claims.

As shown in FIG. 6, the intersection of the longitudinal and radial members 80, 82 produces openings, and the longitudinal and radial members 80, 82 provide attachment points for the access hatches 36 at various desired locations around the enclosure superstructure 78. In this manner, the access hatches 36 may be bolted to the longitudinal and radial members 80, 82 for relatively easy installation and removal for maintenance. In the particular embodiment shown in FIG. 6, the enclosure 30 is joined integrally with the casings for the air filtration and exhaust systems 40, 42. In addition, the mounting fixture 70 external to the enclosure 30 not only supports the enclosure 30, but also provides the base for the enclosure 30. As a result, the lifting attachment 74 may be used to transfer the enclosure 30, the air filtration and exhaust system casings 40, 42, and the mounting fixture 70 together to a transport carrier, thus further expediting removal and replacement of the gas turbine 12.

The systems 10 shown and described with respect to FIGS. 1-6 may thus provide a method for packaging and/or transporting the gas turbine 12. Specifically, the method includes connecting the gas turbine 12 to the plurality of supports 62 and connecting the plurality of supports 62 to the enclosure 30 that peripherally surrounds and extends along a length of the gas turbine 12. The method further includes connecting the first end 32 to the air filtration system 40 and connecting the second end 34 to the exhaust system 42. If desired, the method may include sealing the first and second ends 32, 34 to the air filtration system 40 and exhaust system 42, respectively, to provide an airtight seal between the enclosure 30 and the respective air filtration and exhaust systems 40, 42. In addition, the method may further include insulating an interior surface of the enclosure 30 and/or connecting the gas turbine 12 to one or more auxiliary systems 52 outside of the enclosure 30 through the plurality of fittings 50 through the enclosure 30.

The system 10 and method previously described thus eliminates the need for a separate building that is typically constructed around the gas turbine 12. Instead, the enclosure 30 houses the gas turbine 12 in a much smaller volume, obviating the costs associated with constructing and maintaining a separate building around the gas turbine 12. In addition, in the event that the gas turbine 12 must be replaced, the system 10 allows the enclosure 30 to be quickly disconnected and used to transport the gas turbine 12. Specifically, the enclosure 30 may be readily disconnected from the air filtration system 40, the exhaust system 42, and the auxiliary systems 52, and the entire enclosure 30 with the gas turbine 12 inside may be lifted and transported to a desired location. As a result, it is anticipated that the outage associated with removing and replacing the gas turbine 12 may be reduced by as much as a factor of 4, producing a corresponding reduction in the lost revenues associated with the outage.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for packaging a gas turbine, comprising:
   a. an enclosure peripherally surrounding and extending along an entire length of the gas turbine, wherein said enclosure comprises a first end and a second end opposed to said first end such that said first end and said second end are each disposed in a plane that is generally perpendicular to a centerline of the gas turbine;
   b. a passage between said enclosure and the gas turbine;
   c. means for connecting said first end of said enclosure to an air filtration system;
   d. means for connecting said second end of said enclosure to an exhaust system;
   e. a plurality of supports connected to and extending radially inward from said enclosure; and
   f. means for connecting said plurality of supports to wherein the means for connecting said first end of said enclosure to the air filtration system allows air provided by the air filtration system to flow from the air filtration system into a compressor of the gas turbine and into the passage between the enclosure and the gas turbine.

2. The system as in claim 1, wherein said enclosure is substantially cylindrical.

3. The system as in claim 1, wherein said enclosure comprises an inner wall, an outer wall, and insulation between said inner and outer walls.

4. The system as in claim 3, further comprising perforations in said inner wall.

5. The system as in claim 1, wherein said enclosure comprises at least one access hatch.

6. The system as in claim 1, further comprising a plurality of fittings through said enclosure, wherein each of the plurality of fittings provides a fluid or electrical connection between the gas turbine and one or more systems outside said enclosure.

7. The system as in claim 1, further comprising means for mounting said enclosure on a base external to said enclosure.

8. The system as in claim 1, further comprising means for lifting said enclosure.

9. A system for packaging a gas turbine, comprising:
   a. an enclosure peripherally surrounding and extending along an entire length of the gas turbine, wherein said enclosure comprises a first end and a second end opposed to said first end such that said first end and said second end are each disposed in a plane that is generally perpendicular to a centerline of the gas turbine;
   b. a passage between said enclosure and the gas turbine;
   c. a first clamp proximate to said first end of said enclosure, wherein said first clamp connects said first end of said enclosure to an air filtration system;
   d. a second clamp proximate to said second end of said enclosure, wherein said second clamp connects said second end of said enclosure to an exhaust system; and e, a plurality of supports connected to and extending radially inward from said enclosure, wherein each of said plurality of supports connects said enclosure to the gas turbine, wherein the connection of the air filtration system to the first end allows air provided by the air filtration system to flow from the air filtration system into a compressor of the gas turbine and into the passage between the enclosure and the gas turbine.

10. The system as in claim 9, wherein said enclosure comprises a substantially air impermeable barrier around the gas turbine when said first end of said enclosure is connected to the air filtration system and said second end of said enclosure is connected to the exhaust system.

11. The system as in claim 9, wherein said enclosure comprises an inner wall, an outer wall, and insulation between said inner and outer walls.

12. The system as in claim 11, further comprising perforations in said inner wall.

13. The system as in claim 9, wherein said enclosure comprises at least one access hatch.

14. The system as in claim 9, further comprising a plurality of fittings through said enclosure, wherein each of the plurality of fittings provides a fluid or electrical connection between the gas turbine and one or more systems outside said enclosure.

15. The system as in claim 9, wherein said enclosure includes a mounting fixture outside said enclosure.

16. The system as in claim 9, wherein said enclosure comprises a plurality of longitudinal and radial members.

17. A method for packaging a gas turbine, comprising:
a. connecting the gas turbine to a plurality of supports;
b. connecting said plurality of supports to an enclosure peripherally surrounding and extending along an entire length of the gas turbine;
c. connecting a first end of said enclosure to an air filtration system; and
d. connecting a second end of said enclosure to an exhaust system, wherein said first end is opposed to said second end such that said first end and said second end are each disposed in a plane that is generally perpendicular to a centerline of the gas turbine, wherein the connection of the air filtration system to the first end allows air provided by the air filtration system to flow from the air filtration system into a compressor of the gas turbine and into the passage between the enclosure and the gas turbine.

18. The method as in claim 17, further comprising sealing said first end of said enclosure to the air filtration system and sealing said second end of said enclosure to the exhaust system.

19. The method as in claim 17, further comprising insulating an interior surface of said enclosure.

20. The method as in claim 17, further comprising connecting the gas turbine to one or more systems outside said enclosure through a plurality of fittings through said enclosure.

* * * * *